(12) United States Patent
Lin et al.

(10) Patent No.: US 11,984,748 B2
(45) Date of Patent: May 14, 2024

(54) BATTERY MODULE BASED ON FULL CURRENT CONTROL AND BATTERY ENERGY STORAGE SYSTEM

(71) Applicants: XIAMEN HECHU ENERGY TECHNOLOGY CO., LTD., Xiamen (CN); CSG POWER GENERATION (GUANGDONG) ENERGY STORAGE TECHNOLOGY CO., LTD., Guangzhou (CN)

(72) Inventors: Weixing Lin, Foshan (CN); Wenping Zuo, Foshan (CN); Zhiqiang Wang, Guangzhou (CN); Bangjin Liu, Guangzhou (CN); Chao Dong, Guangzhou (CN)

(73) Assignees: XIAMEN HECHU ENERGY TECHNOLOGY CO., LTD., Xiamen (CN); CSG POWER GENERATION (GUANGDONG) ENERGY STORAGE TECHNOLOGY CO., LTD., Guangzhou (CN)

(*) Notice: Subject to any disclaimer, the term of this patent is extended or adjusted under 35 U.S.C. 154(b) by 0 days.

(21) Appl. No.: 18/198,439

(22) Filed: May 17, 2023

(65) Prior Publication Data
US 2023/0307935 A1 Sep. 28, 2023

Related U.S. Application Data

(63) Continuation of application No. PCT/CN2023/083489, filed on Mar. 23, 2023.

(30) Foreign Application Priority Data

Mar. 25, 2022 (CN) .......................... 202210297970.7

(51) Int. Cl.
*H02J 7/00* (2006.01)
(52) U.S. Cl.
CPC ........ *H02J 7/0068* (2013.01); *H02J 7/00712* (2020.01); *H02J 2207/20* (2020.01)
(58) Field of Classification Search
CPC .................................................. H02J 7/0068
USPC ........................................................ 320/134
See application file for complete search history.

(56) References Cited

U.S. PATENT DOCUMENTS

2016/0028257 A1* 1/2016 Hashimoto ......... H01M 10/482
320/112
2019/0237713 A1* 8/2019 Seol ..................... H01M 10/643
2019/0326746 A1* 10/2019 Li ....................... G01R 31/3835

FOREIGN PATENT DOCUMENTS

CN   102545291 A   7/2012
CN   109245220 A   1/2019
CN   113991662 A   1/2022

* cited by examiner

*Primary Examiner* — Yalkew Fantu
(74) *Attorney, Agent, or Firm* — Zhigang Ma (57) ABSTRACT

The invention discloses a full current control battery module and an energy storage system of full current control battery, belonging to the field of electric energy storage, wherein the full current control battery module comprises an energy transmission control unit, a relay energy unit and a current control unit. The invention can realize the separate current control of each battery module and isolate the influence of the current generated by the external DC system on the battery module.

13 Claims, 6 Drawing Sheets

BATTERY MODULE BASED ON FULL CURRENT CONTROL AND BATTERY ENERGY STORAGE SYSTEM

TECHNICAL FIELD

The invention belongs to the field of electric energy storage, and more specifically relates to a battery module and battery energy storage system based on full current control.

BACKGROUND

With the proposal of carbon peaking and carbon neutrality goals of "3060", the proportion of wind power generation and photovoltaic power generation in the electric power system will rise in a large scale. In order to resist the intermittency and the volatility brought by large-scale new energy power generation, electric energy storage has become an indispensable part of future power system.

Usually, the existing battery energy storage system consists of multiple battery cells in series and parallel to form a battery module, which is connected in series to form a battery cluster. Moreover, the charge and discharge current of each battery module in series within the battery cluster is consistent, and the current of each battery module cannot be controlled exquisitely. Therefore, even if a single battery pack has been overcharged or overdischarged, the current of the battery module cannot be controlled, and the battery pack continues to be overcharged or overdischarged, which will cause fire and other major safety risks.

The reference, i.e. "Controllable battery module (Invention Patent No.: CN201110298035.4) of Ling Zhibin", proposes a controllable battery module, including four controllable switches and a battery string composed of energy storage battery cells, wherein the battery module can be positively or negatively connected to the circuit by controlling the controllable switch. When the battery module is connected to the circuit, the current flowing into the battery module is equal to or opposite to the current in the circuit. If the circuit current contains both positive and negative current in one cycle, the working performance of the battery module will be affected and the service life of the battery module will be reduced.

The reference, i.e. "Combination system of battery module (Invention Patent No.: CN201610828251.8) of Shanghai Jineng Power System Co., Ltd." proposes a combination system of battery module, including a plurality of standard battery modules and a host computer of battery management system, wherein the multiple standard battery modules are connected in series, parallel or series and parallel to form a battery pack, each battery module in the combination system of battery module is directly connected in series or parallel, the current of each battery module cannot be controlled exquisitely. Therefore, even if a single battery pack has been overcharged or overdischarged, the current of the battery module cannot be controlled, and the battery pack continues to be overcharged or overdischarged, which will cause fire and other major safety risks.

Therefore, how to solve the influence of external DC system on the working performance of the battery module and how to achieve separate control of the current of each battery module are urgent technical problems to be solved.

SUMMARY

For the defect of the prior art, the invention aims to provide a battery module and battery energy storage system based on full current control, which can realize the separate current control of each battery module and isolate the influence of the current generated by the external DC system on the current of the battery module.

To realize the purposes above, on the one hand, the invention provides a battery module based on full current control, which is applied to each battery module in a battery energy storage system, including an energy transmission control unit, a intermediate energy unit and a current control unit, wherein the high-voltage end of the energy transmission control unit is connected with the high-voltage ends of the intermediate energy unit and the current control unit respectively, the low-voltage end of the energy transmission control unit is connected with the low-voltage ends of the intermediate energy unit and the current control unit.

When the battery energy storage system is in a charging state, the energy transmission control unit is used to control the transmission of electric energy output by the external DC system to the intermediate energy unit, the intermediate energy unit is used to absorb and store electric energy output by an external DC system, the current control unit is used for closed-loop control of the charge current of the battery module according to the average energy stored by the intermediate energy unit, so as to balance the electric energy output by the DC system after deducting the loss of the battery energy storage system with the charge energy required by the battery module, and control the intermediate energy unit to stop absorbing energy from the DC system through the energy transmission control unit when the voltage of the battery module exceeds the cut-off voltage of charging.

When the battery energy storage system is in a discharging state, the intermediate energy unit is used to absorb and store the discharge energy output by the battery module, the energy transmission control unit is used to control the transmission of energy stored by the intermediate energy unit to the external DC system the current control unit is used for closed-loop control of the discharge current of the battery module according to the average energy stored by the intermediate energy unit, so as to balance the electric energy obtained by the DC system after deducting the loss of the battery energy storage system with the discharge energy of the battery module, and control the intermediate energy unit to stop transmitting energy to the external DC system or discharge load through the energy transmission control unit when the voltage of the battery module lower than the cut-off voltage of discharging.

The battery module based full current control provided by the invention uses the energy transmission control unit to control the charging energy of the intermediate energy unit from the external DC system, so as to avoid the energy fluctuations caused by the AC current component and harmonic current component output by the external DC system to be completely transmitted to the back-end battery module, reduce the influence of the external loop current on the working performance of the battery module, and prolong the service life of the battery module effectively. At the same time, it uses the energy transmission control unit to cut off the charge/discharge circuit when the voltage of the battery module exceeds the cut-off voltage of charging or is lower than the cut-off voltage of discharging, so as to realize the separate control of each battery module in the battery energy storage system and avoid the risk of fire or damage caused by the overcharging heat loss of the battery module.

Further, the energy transmission control unit comprises fully controlled power electronic devices Q1 and Q2, wherein the low-voltage end of the fully controlled power electronic device Q1 and the high-voltage end of the fully controlled power electronic device Q2 are connected together to form the midpoint of the energy transmission control unit, the high-voltage end of the fully controlled power electronic device Q1 is the high-voltage end of the energy transmission control unit, and the low-voltage end of the fully controlled power electronic device Q2 is the low-voltage end of the energy transmission control unit.

The energy transmission control unit and the DC system are connected in two ways, wherein the first way is as follows: the high-voltage end of the energy transmission control unit is connected with the positive DC bus of the DC system, and the midpoint of the energy transmission control unit is connected with the negative DC bus of the DC system. The second way is as follows: the midpoint of the energy transmission control unit is connected with the positive DC bus of the DC system, and the low-voltage end of the energy transmission control unit is connected with the negative DC bus of the DC system.

Moreover, the energy transmission control unit comprises fully controlled power electronic devices Q3 to Q6, wherein the high-voltage end of the fully controlled power electronic device Q3 and the high-voltage end of the fully controlled power electronic device Q4 are connected together to form the high-voltage end of the energy transmission control unit, the low-voltage end of the fully controlled power electronic device Q5 and the low-voltage end of the fully controlled power electronic device Q6 are connected together to form the low-voltage end of the energy transmission control unit, the low-voltage end of the fully controlled power electronic device Q3 is respectively connected with the high-voltage end of the fully controlled power electronic device Q5 and the positive DC bus of the DC system, and the low-voltage end of the fully controlled power electronic device Q4 is respectively connected with the high-voltage end of the fully controlled power electronic device Q6 and the negative DC bus of the DC system.

The intermediate energy unit comprises 1 or more direct current capacitors C in parallel, wherein the positive electrode of the direct current container C is the high-voltage end of the intermediate energy unit, and the negative terminal of the direct current container C is the low-voltage end of the intermediate energy unit.

The current control unit comprises a controller and one or more phase circuits, each phase circuit comprises an upper fully controlled power electronic device, a lower fully controlled power electronic device and a DC inductor, wherein the controller is respectively connected with the energy transmission control unit, the intermediate energy unit, the upper fully controlled power electronic device and the lower fully controlled power electronic device in each phase circuit.

In addition, each phase circuit includes an upper fully controlled power electronic device, a lower fully controlled power electronic device and a DC inductor, wherein the high-voltage end of each phase circuit of the upper fully controlled power electronic device is connected together to form the high-voltage end of the current control unit. In the same phase circuit, the low-voltage end of the upper fully controlled power electronic device is connected with the high-voltage end of the lower fully controlled power electronic device and one end of the DC inductor respectively, the other end of the DC inductor in each phase circuit is connected together to form a midpoint of the current control unit, and the low-voltage end of the lower fully controlled power electronic device in each phase circuit is connected together to form the low-voltage end of the current control unit.

The current control unit and the battery module are connected in two ways, wherein the first way is as follows: the high-voltage end of the current control unit is connected with the positive electrode of the battery module, and the midpoint of the current control unit is connected with the negative electrode of the battery module. The second way is as follows: the midpoint of the current control unit is connected with the positive electrode of the battery module, and the low-voltage end of the current control unit is connected with the negative electrode of the battery module.

When the number of phase circuits N in the current control unit is multiple, the angle of carrier difference of each phase circuit is 360°/N in turn, wherein N is a positive integer greater than or equal to 2.

It also includes a preprocessing unit, and the preprocessing unit includes a fully controlled power electronic device Q7 and a precharged freewheel diode D, the fully controlled power electronic device Q7 and the precharged freewheel diode D are connected in two ways.

The first way is as follows: The positive electrode of the precharged freewheel diode D is connected with the high-voltage end of the fully controlled power electronic device Q7 to form the low-voltage end of the preprocessing unit, the negative electrode of the precharged freewheel diode D is connected with the positive electrode of the battery module to form the high-voltage end of the precharged freewheel diode D, and the low-voltage end of the fully controlled power electronic device Q7 is connected with the negative electrode of the battery module.

The second way is as follows: The negative electrode of the precharged current diode D is connected with the low-voltage end of the fully controlled power electronic device Q7 to form the high-voltage end of the preprocessing unit, the high-voltage end of the fully controlled power electronic device Q7 is connected with the positive electrode of the battery module, and the positive electrode of the precharged current diode D is connected with the negative electrode of the battery module to form the low-voltage end of the preprocessing unit.

The preprocessing unit and the current control unit are connected in two ways.

The first way is as follows: the high-voltage end of the preprocessing unit is connected with the high-voltage end of the current control unit, and the low-voltage end of the preprocessing unit is connected with the midpoint of the current control unit. The second way is as follows: the high-voltage end of the preprocessing unit is connected with the midpoint of the current control unit, and the low-voltage end of the preprocessing unit is connected with the low-voltage end of the current control unit.

It includes a preprocessing unit, and the preprocessing unit comprises a fully controlled power electronic device Q7, a precharged freewheel diode D and a fully controlled power electronic device Q8, and the fully controlled power electronic device Q8, the fully controlled power electronic device Q7 and the precharged freewheel diode D are connected in four ways.

The first way is as follows: The negative electrode of the precharged freewheel diode D is connected with the positive electrode of the battery module to form the high-voltage end of the preprocessing unit, the positive electrode of the precharged freewheel diode D is connected with the high-voltage end of the fully controlled power electronic device Q7 to form the low-voltage end of the preprocessing unit, the low-voltage end of the fully controlled power electronic device Q7 is connected with the low-voltage end of the fully controlled power electronic device Q8, and the high-voltage end of the fully controlled power electronic device Q8 is connected with the negative electrode of the battery module.

The second way is as follows: The negative electrode of the precharged freewheel diode D is connected with the high-voltage end of the fully controlled power electronic device Q7 to form the high-voltage end of the preprocessing unit, the low-voltage end of the fully controlled power electronic device Q7 is connected with the low-voltage end of the fully controlled power electronic device Q8, the high-voltage end of the fully controlled power electronic device Q8 is connected with the positive electrode of the battery module, the positive electrode of the precharged freewheel diode D and the negative electrode of the battery module are connected together to form the low-voltage end of the preprocessing unit.

The third way is as follows: The negative electrode of the precharged freewheel diode D is connected with the positive electrode of the battery module to form the high-voltage end of the preprocessing unit, the positive electrode of the precharged freewheel diode D is connected with the low-voltage end of the fully controlled power electronic device Q8 to form the low-voltage end of the preprocessing unit, the high-voltage end of the fully controlled power electronic device Q8 is connected with the high-voltage end of the fully controlled power electronic device Q7, and the low-voltage end of the fully controlled power electronic device Q7 is connected with the negative electrode of the battery module.

The fourth way is as follows: The negative electrode of the precharged freewheel diode D is connected with the low-voltage end of the fully controlled power electronic device Q8 to form the high-voltage end of the preprocessing unit, the high-voltage end of the fully controlled power electronic device Q8 is connected with the high-voltage end of the fully controlled power electronic device Q7, the low-voltage end of the fully controlled power electronic device Q7 is connected with the positive electrode of the battery module, and the positive electrode of the precharged freewheel diode D is connected with the negative electrode of the battery module to form the low-voltage end of the preprocessing unit.

Both the upper fully controlled power electronic device and the lower fully controlled power electronic device adopt one or more transistors and diodes in inverse parallel with them.

The transistor is a transistor with power field effect or an insulated gate bipolar transistor.

In the second aspect, the invention provides a battery energy storage system based on full current control, including a plurality of battery modules based full current control mentioned above, and the full current control battery modules are connected with an external AC system after being connected in series or parallel.

The number of individual batteries connected in series by each battery module is 12-24.

Compared with the traditional battery energy storage system, the battery energy storage system based on full current control provided by the invention comprises a plurality of battery modules based on full current control. The battery control module based on full current control uses the energy transmission control unit to control the charging energy of the external DC system to the intermediate energy unit, which can prevent the energy fluctuations caused by the AC current component and harmonic current component of the external DC system from being completely transmitted to the back-end battery module, reduce the influence of the external loop current on the working performance of the battery module, and extend the service life of the battery module effectively. At the same time, when the voltage of the battery module exceeds the cut-off voltage of charging or is lower than the cut-off voltage of discharging, the charge and discharge circuit can be cut off in time by using the energy transmission control unit, so as to realize the separate control of each battery module in the battery energy storage system and avoid the risk of fire or damage caused by the over-charging heat loss of the battery module.

DETAILED DESCRIPTION OF EMBODIMENTS

In order to make the purpose, technical scheme and advantages of the invention more clear, the invention is further explained in detail in combination with the drawings and embodiments. It should be understood that the specific embodiments described herein are intended only to explain the invention and are not intended to qualify it.

It should be noted that the DC system is an independent power supply. When the DC system is running, the DC system will provide DC power to discharge loads such as intermediate protection and automatic devices, tripping and closing of circuit breaker, carrier communication, accident lighting, DC motor, etc. At the same time, it will also charge each battery module in the battery energy storage system to supplement the self-discharge of the battery module, and keep the battery module in standby state at full capacity. When the DC system fails or the external AC power is interrupted, the battery energy storage system will continue to provide DC power to the discharge load to ensure the normal operation of the discharge load.

However, when each battery module in the existing battery energy storage system is connected to the external DC system (external circuit), the current of the external circuit will flow through the battery module completely. If the circuit current contains both positive and negative current in one cycle, that is, current fluctuation will affect the working performance of the battery module and reduce the service life of the battery module. In addition, each battery module does not have the ability to control the current of the battery module, which means overcharge or overdischarge of the battery module may occur.

In order to solve the problem that the external DC system affects the performance of the battery module and the current of each battery module cannot be controlled separately, the invention provides a battery module based on full current control, which is applied to each battery module in the battery energy storage system, that is, each battery module in the battery energy storage system is equipped with a battery module based on full current control provided by the invention.

Figure 1:
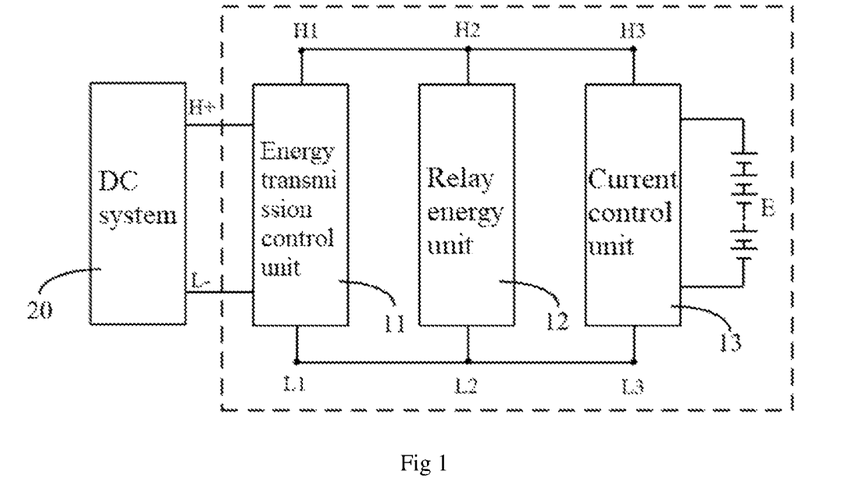
FIG. 1 is a schematic diagram of a battery module based on full current control provided by an embodiment of the invention.

FIG. 1 is a schematic diagram of a battery module based on full current control provided by an embodiment of the invention. As shown in FIG. 1, the battery module based on full current control comprises an energy transmission control unit 11, a intermediate energy unit 12 and a current control unit 13, wherein the high-voltage end H1 of the energy transmission control unit 11, the high-voltage end H2 of the intermediate energy unit 12 and the high-voltage end H3 of the current control unit 13 are connected to each other, the low-voltage end L1 of the energy transmission control unit 11, the low-voltage end L2 of the intermediate energy unit 12 and the low-voltage end L3 of the current control unit 13 are connected to each other.

The cooperative relationship of the energy transmission control unit 11, the intermediate energy unit 12 and the current control unit 13 provided in this embodiment is as follows:

When the battery energy storage system is in a charging state, the energy transmission control unit 11 is used to control the electric energy output by the external DC system 20 to the intermediate energy unit 12, the intermediate energy unit 12 is used to absorb and store the electrical energy output by the external DC system 20, the current control unit 13 is used for the closed-loop control of the charge current of battery module E according to the average energy stored by the intermediate energy unit 12. Specifically, when the average energy stored by the intermediate energy unit 12 is higher than the average energy rating of the intermediate energy unit 12, the current control unit 13 will increase the charge current to battery module E, so as to increase the electric energy absorbed by battery module E from the intermediate energy unit 12. When the average energy stored by the intermediate energy unit 12 is lower than the average energy rating of the intermediate energy unit 12, the current control unit 13 will reduce the charge current to battery module E to reduce the electric energy absorbed by battery module E from the intermediate energy unit 12, and balance the electric energy output by the external DC system 20 with the charging energy required by the battery module E after deducting the loss of battery energy storage system.

By controlling the average energy stored in the intermediate energy unit 12 to the average energy rating stored in the intermediate energy unit 12 in the charging state provided by this embodiment, the energy (including the energy fluctuations caused by the AC current component and harmonic current component) output by DC system 20 can be prevented from completely transferring to the back-end battery module E, the influence of the DC system 20 on the battery module E can be isolated effectively, and the service life of the battery module can be prolonged effectively. When the voltage of battery module E exceeds the cutoff voltage of charging in the charging state, the current control unit 13 can use the energy transmission control unit 11 to control the intermediate energy unit 12 to stop absorbing energy from the external DC system, that is, to cut off the charging circuit to prevent the battery module E from overcharging and prevent overcharging. Similarly, when other battery modules in the battery energy storage system are in charging state, their control mode is similar to the control mode for battery module E, which will not be described in this embodiment, so as to realize independent charging control for each battery module E in the battery energy storage system.

When the battery energy storage system is in discharging state, the intermediate energy unit 12 is used to absorb and stores the electric energy output by the DC system 20, the energy transmission control unit 11 is used to control the transmission of the electric energy stored in the intermediate energy unit 12 to the external DC system 20 or the external discharge load, the current control unit 13 is used for the closed-loop control of the discharge current of battery module E according to the average energy stored in the intermediate energy unit 12. Specifically, when the average energy stored by the intermediate energy unit 12 is higher than the average energy rating stored by the intermediate energy unit 12, the current control unit 13 will reduce the discharge current to the battery module E, so as to reduce the electric energy injected by the battery module E to the intermediate energy unit 12. When the average energy stored by the intermediate energy unit 12 is lower than the average energy rating stored by the intermediate energy unit 12, the current control unit 13 will increase the discharge current to the battery module E, so as to increase the electric energy injected by the battery module E to the intermediate energy unit 12, and balance the electric energy obtained by the external DC system 20 with the discharge energy of the battery module E after deducting the loss of the battery energy storage system.

By controlling the average energy stored in the intermediate energy unit 12 to the average energy rating stored in the intermediate energy unit 12 in the discharge state provided in this embodiment, the energy absorbed by all DC systems 20 provided by the back-end battery module E (including the energy fluctuations caused by the AC current component and harmonic current component, etc.) can be avoided, which means the DC part of the energy absorbed by the DC system 20 provided by the back-end battery module E is required only for effectively isolating the influence of the DC system 20 on the battery module E and effectively prolonging the service life of the battery module. When the voltage of battery module E is lower than the cutoff voltage of discharging in the discharging state, the current control unit 13 can use the energy transmission control unit 11 to control the intermediate energy unit to stop transmitting energy to the external DC system 20 or to discharge loads, that is, to cut off the discharge circuit to prevent overdischarge of battery module E and prevent overdischarge. Similarly, when other battery modules in the battery energy storage system are in discharging state, their control mode is similar to the control mode for battery module E, which will not be described in this embodiment, so as to realize separate discharge control for each battery module in the battery energy storage system.

The battery module based on full current control provided in this embodiment uses the energy transmission control unit 11 to control the charging energy of the external DC system 20 to the intermediate energy unit 12, so as to prevent the energy fluctuations caused by the AC current component and harmonic current component output by the external DC system 20 to be transmitted to the back-end battery module completely, reduce the influence of external circuit current on the working performance of battery module E, and prolong the service life of battery module E effectively. At the same time, when the voltage of battery module E exceeds the cut-off voltage of charging or is lower than the cut-off voltage of discharging, the charge and discharge circuit can be cut off in time by using the energy transmission control unit 11, which can realize the separate control of each battery module E in the battery energy storage system, and avoid the risk of fire or damage caused by overcharging heat loss of battery module E.

Figure 2:
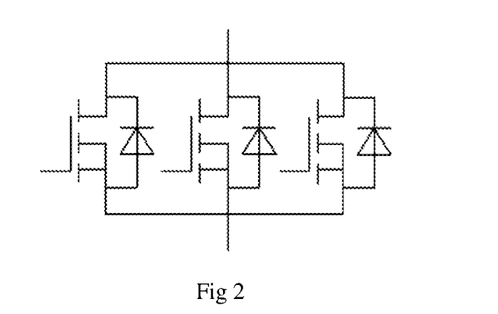
FIG. 2 is a circuit schematic diagram of a fully controlled power electronic device provided by an embodiment of the invention.

It should be noted that, as shown in FIG. 2, all fully controlled power electronic devices mentioned below can adopt one or more transistors and diodes in reverse parallel with them. The transistor adopted is a fully controlled power electronic device such as transistor with power field effect or insulated gate bipolar transistor, which can not only control the opening of power electronic devices, but also control the cutting off of power electronic devices.

When the transistor adopted is an insulated gate bipolar transistor, the high-voltage end of the fully controlled power electronic device mentioned below is the collector electrode of the insulated gate bipolar transistor, and the low-voltage end of the fully controlled power electronic device is the emitting electrode of the fully controlled power electronic device. When the transistor adopted is a transistor with power field effect, the high-voltage end of the fully controlled power electronic device is the drain electrode of the transistor with power field effect, and the low-voltage end of the fully controlled power electronic device is the source electrode of the transistor with power field effect.

In an embodiment, the energy transmission control unit 11 may adopt two or four fully controlled power electronic devices, that is, the combination of fully controlled power electronic devices Q1 and Q2 or the combination of fully controlled power electronic devices Q3 to Q6. Specifically, two or four fully controlled power electronic devices can be selected according to whether the voltage of external DC system 20 will reverse direction. That is, when the DC voltage of external DC system 20 continues to be positive, the energy transmission control unit 11 adopts two fully controlled power electronic devices. When the DC voltage of the external DC system 20 can be either positive or negative, the energy transmission control unit 11 adopts four fully controlled power electronic devices.

Figure 4:
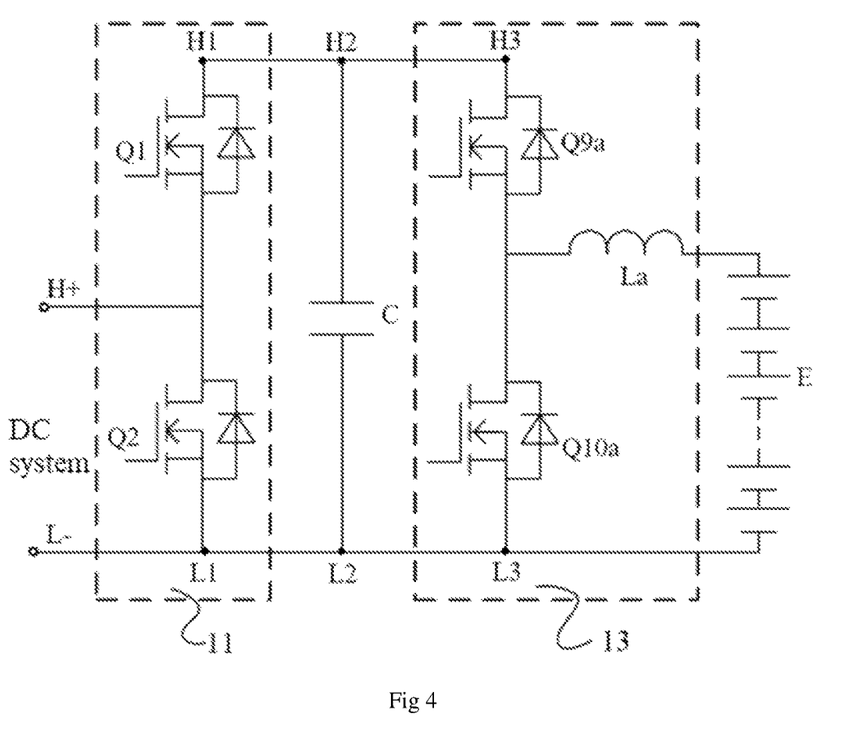
FIG. 4 is the topology structure of the battery module based on full current control provided by embodiment 1 of the invention.

As shown in FIG. 4, when energy transmission control unit 11 adopts two fully controlled power electronic devices (Q1 and Q2), and the specific connection relationship is as follows: The low-voltage end of fully controlled power electronic device Q1 and the high-voltage end of fully controlled power electronic device Q2 are connected together to form the midpoint of energy transmission control unit 11, the high-voltage end of fully controlled power electronic device Q1 is the high-voltage end H1 of energy transmission control unit 11, and the low-voltage end of fully controlled power electronic device Q2 is the low-voltage end L1 of energy transmission control unit 11.

Figure 15:
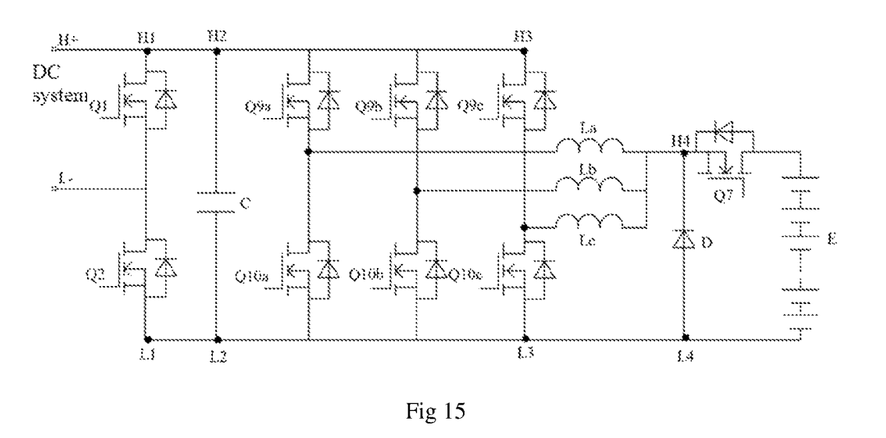
FIG. 15 is the topology structure of the battery module based on full current control provided by embodiment 12 of the invention.

In this embodiment, when the energy transmission control unit 11 adopts two fully controlled power electronic devices, the energy transmission control unit 11 and the external DC system can be connected in two ways. The first way is as follows: as shown in FIG. 15, the high-voltage end H1 of the energy transmission control unit 11 is connected to the positive DC bus H+ of the DC system, and the midpoint of the energy transmission control unit 11 is connected to the negative DC bus L− of the DC system. The second way is as follows: as shown in FIG. 4, the midpoint of the energy transmission control unit 11 is connected to the positive DC bus H+ of the DC system, and the low-voltage end L1 of the energy transmission control unit 11 is connected to the negative DC bus L− of the DC system. The specific connection mode can be set according to the actual situation. There is no restriction in this embodiment.

Figure 9:
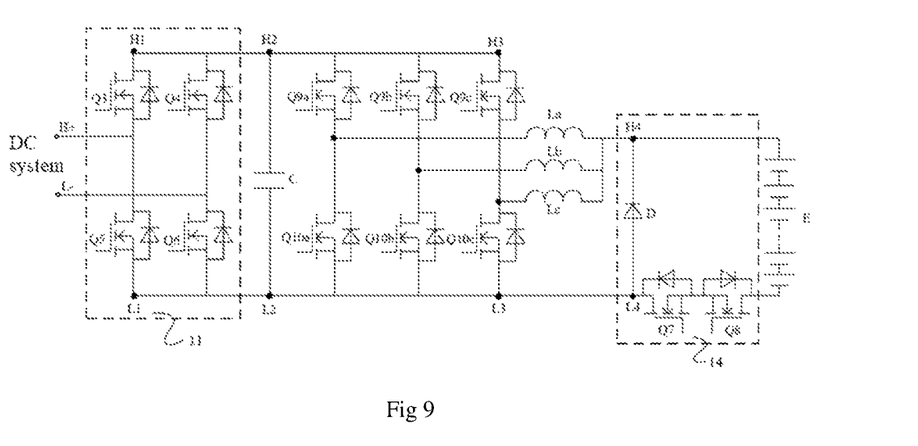
FIG. 9 is the topology structure of the battery module based on full current control provided by embodiment 6 of the invention.

As shown in FIG. 9, when the energy transmission control unit 11 adopts four fully controlled power electronic devices (Q3 to Q6), there is only one connection mode between the energy transmission control unit 11 and the external DC system. The specific connection mode is as follows: The high-voltage end of fully controlled power electronic device Q3 and the high-voltage end of fully controlled power electronic device Q4 are connected together to form the high-voltage end H1 of energy transmission control unit 11, the low-voltage end of the fully controlled power electronic device Q5 and the low-voltage end of the fully controlled power electronic device Q6 are connected together to form the low-voltage end L1 of the energy transmission control unit 11, the low-voltage end of fully controlled power electronic device Q3 is respectively connected to the high-voltage end of fully controlled power electronic device Q5 and the positive DC bus H+ of the DC system, and the low-voltage end of fully controlled power electronic device Q4 is respectively connected to the high-voltage end of fully controlled power electronic device Q6 and the negative DC bus L− of the DC system.

Figure 3:
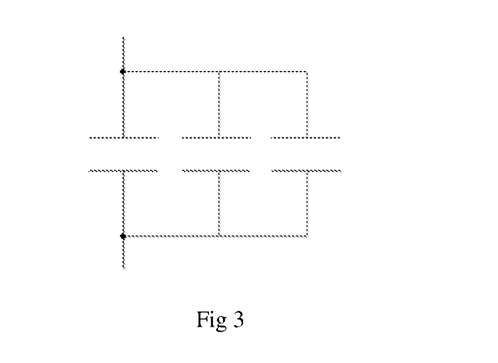
FIG. 3 is a circuit schematic diagram of a intermediate energy unit provided by an embodiment of the invention.

In an embodiment, the intermediate energy unit 12 may adopt one or more DC capacitors C connected in parallel (as shown in FIG. 3), wherein the positive pole of DC container C is the high-voltage end H2 of the intermediate energy unit 12, and the negative pole of DC container C is the low-voltage end L2 of the intermediate energy unit 12. In this embodiment, the number of DC container C used by the intermediate energy unit 12 can be obtained by dividing the capacity of the total capacitance required by the intermediate energy unit 12 by the capacity of a single DC container C, and the total capacitance required by the intermediate energy unit 12 is determined by the energy fluctuation of the external DC system 20 and the total loss of the DC capacitance C that can be accepted.

Figure 5:
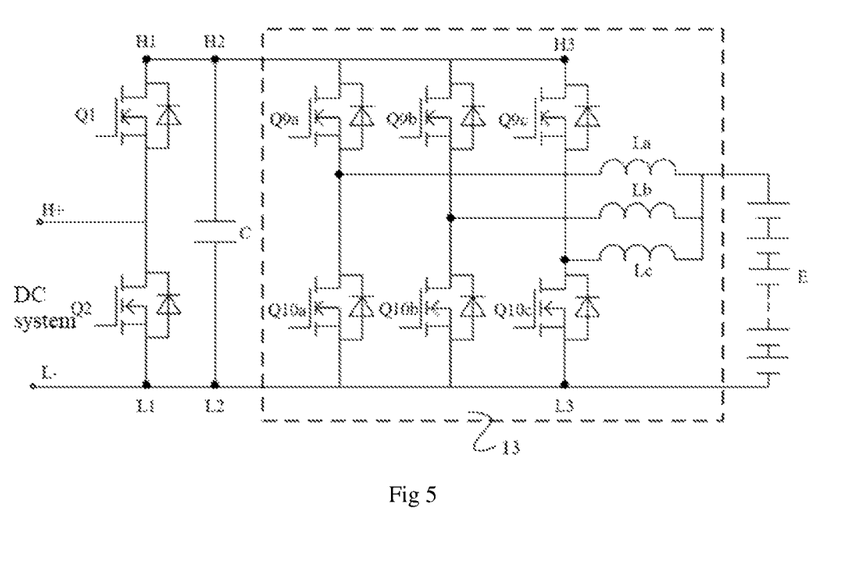
FIG. 5 is the topology structure of the battery module based on full current control provided by embodiment 2 of the invention.

In an embodiment, as shown in FIG. 4 and FIG. 5, the current control unit 13 comprises a controller (not shown in the figure) and one or more phase circuits, each of which comprises an upper fully controlled power electronic device, a lower fully controlled power electronic device and a DC inductor. The controller is respectively connected with the energy transmission control unit 11, the intermediate energy unit 12, the upper fully controlled power electronic device and the lower fully controlled power electronic device in each phase circuit.

The high-voltage end of the upper fully controlled power electronic device in each phase circuit is connected together to form the high-voltage end H3 of the current control unit 13. In the same phase circuit, the low-voltage end of the upper fully controlled power electronic device is connected with the high-voltage end of the lower fully controlled power electronic device and one end of the DC inductor, the other ends of the DC inductors in each phase circuit are connected together to form the midpoint of the current control unit 13, and the low-voltage ends of the lower fully controlled power electronic devices in each phase circuit are connected together to form the low-voltage end L3 of the current control unit 13.

Figure 6:
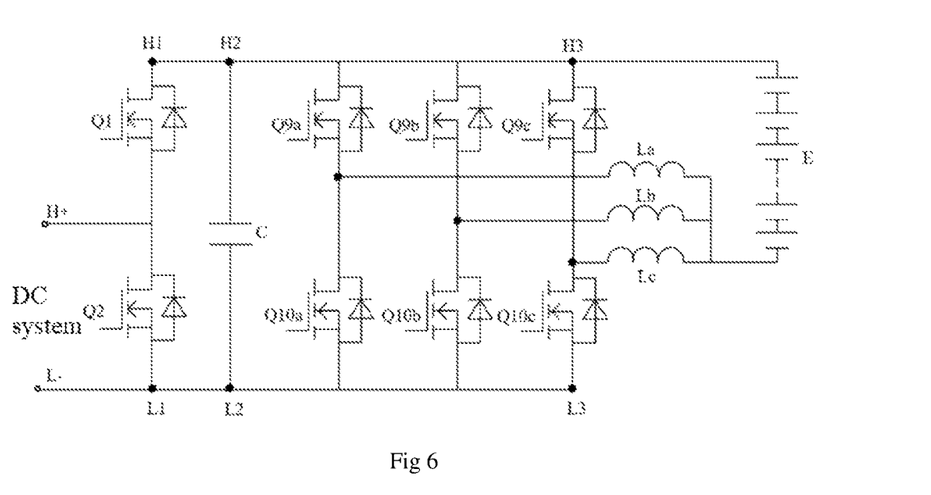
FIG. 6 is the topology structure of the battery module based on full current control provided by embodiment 3 of the invention.

When the current control unit 13 provided by the invention adopts the phase circuit mentioned above, the current control unit 13 and the corresponding connected battery module E can be connected in two ways. The first way is as follows: as shown in FIG. 6, the high-voltage end H3 of the current control unit 13 is connected to the positive pole of the battery module E, and the midpoint of the current control unit 13 is connected to the negative pole of the battery module E. The second way is as follows: as shown in FIG. 4, the midpoint of current control unit 13 is connected to the positive pole of battery module E, and the low-voltage end L3 of current control unit 13 is connected to the negative pole of battery module E.

In an embodiment, the he battery module based on full current control provided by the invention may also include a preprocessing unit 14 to switch it the non-working state to the working state smoothly, wherein the preprocessing unit 14 is used to precharge the DC container C in the energy transmission control unit 11 before the battery module E starts working, and avoid damage to DC container C due to excessive discharge current of battery module E at the moment of startup.

Specifically, the preprocessing unit 14 can adopt the fully controlled power electronic device Q7 and the precharged freewheel diode D, and the fully controlled power electronic device Q7 and the precharged freewheel diode D are connected in two ways.

Figure 7:
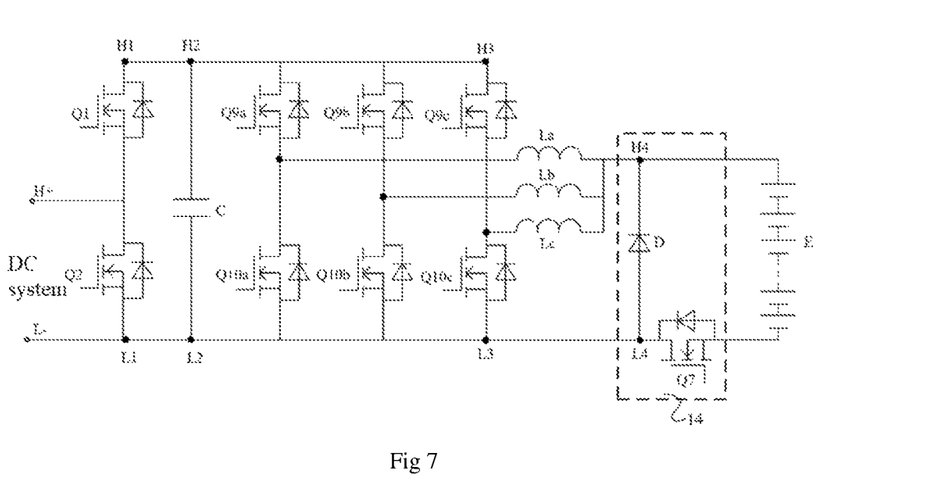
FIG. 7 is the topology structure of the battery module based on full current control provided by embodiment 4 of the invention.
Figure 14:
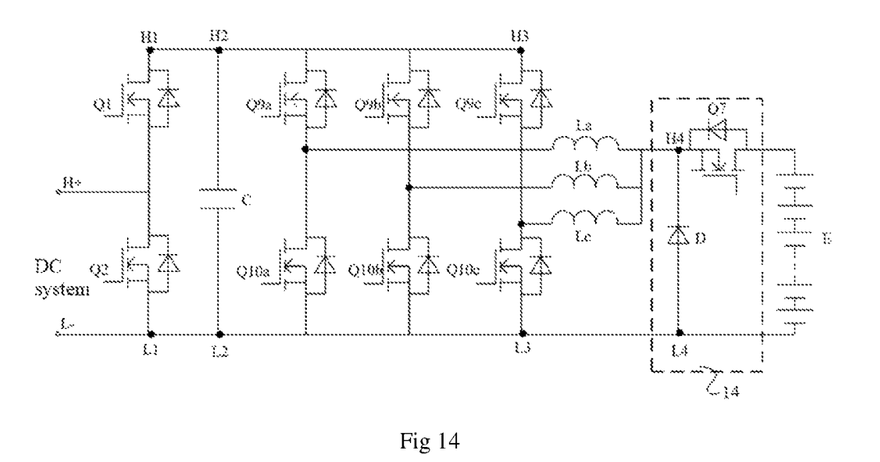
FIG. 14 is the topology structure of the battery module based on full current control provided by embodiment 110 of the invention.

The first way is as follows: As shown in FIG. 7, the positive electrode of precharged freewheel diode D is connected with the high-voltage end of fully controlled power electronic device Q7 to form the low-voltage end L4 of preprocessing unit 14, the negative electrode of precharged freewheel diode D is connected with the positive electrode of battery module E to form the high-voltage end H4 of preprocessing unit 14, the low-voltage end of the fully controlled power electronic device Q7 is connected to the negative electrode of the battery module E. The second way is as follows: as shown in FIG. 14, the negative electrode of the precharged freewheel diode D is connected with the low-voltage end of the fully controlled power electronic device Q7 to form the high-voltage end H4 of the preprocessing unit 14, the high-voltage end of the fully controlled power electronic device Q7 is connected with the positive electrode of the battery module E, and the positive electrode of precharged freewheel diode D is connected with the negative electrode of battery module E to form the low-voltage end L4 of preprocessing unit 14.

In an embodiment, it is considered that when the existing conventional battery module and controllable battery module are reversed connected, the short-connecting event of the battery module will occur, which will lead to the occurrence of overcurrent, fire and even battery explosion, affecting the safety of the assembly, operation and inspection of the battery energy storage system.

In order to avoid the short circuit accident that exists when the external circuit of the existing battery module is reversed, the preprocessing unit 14 provided in the embodiment above can also include a fully controlled power electronic device Q8. Specifically, the fully controlled power electronic device Q8, the fully controlled power electronic device Q7 and the precharged freewheel diode D can be in four ways.

Figure 8:
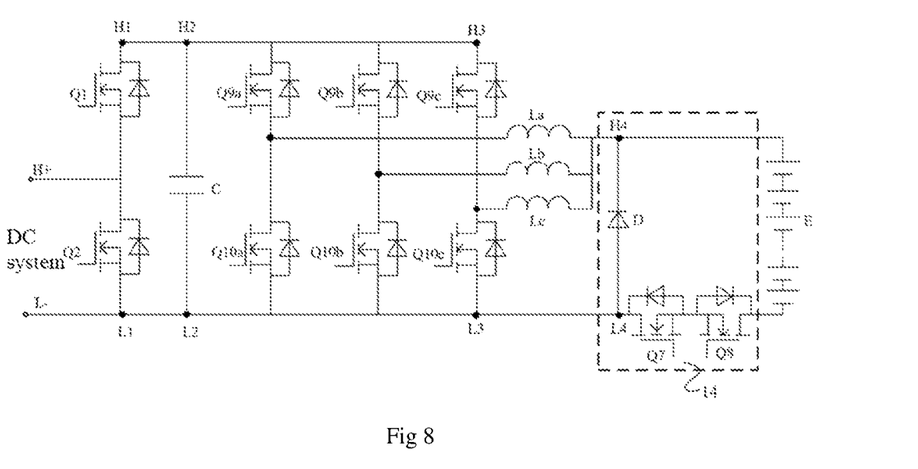
FIG. 8 is the topology structure of the battery module based on full current control provided by embodiment 5 of the invention.

The first way is as follows: As shown in FIG. 8, the negative electrode of precharged freewheel diode D is connected with the positive electrode of battery module E to form the high-voltage end H4 of preprocessing unit 14, the positive electrode of precharged freewheel diode D is connected with the high-voltage end of fully controlled power electronic device Q7 to form the low-voltage end L4 of preprocessing unit 14, the low-voltage end of the fully controlled power electronic device Q7 is connected to the low-voltage end of the fully controlled power electronic device Q8, and the high-voltage end of the fully controlled power electronic device Q8 is connected to the negative electrode of the battery module E.

Figure 11:
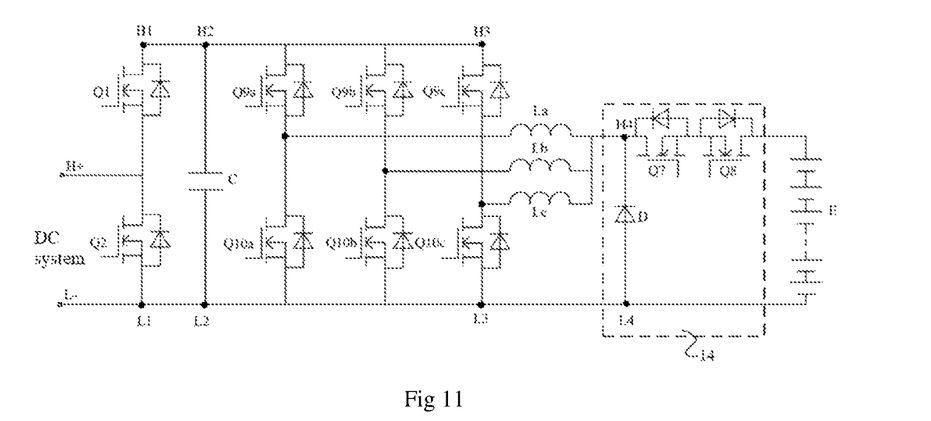
FIG. 11 is the topology structure of the battery module based on full current control provided by embodiment 8 of the invention.

The second way is as follows: As shown in FIG. 11, the negative electrode of the precharged freewheel diode D is connected with the high-voltage end of the fully controlled power electronic device Q7 to form the high-voltage end H4 of the preprocessing unit 14, the low-voltage end of the fully controlled power electronic device Q7 is connected with the low-voltage end of the fully controlled power electronic device Q8, the high-voltage end of the fully controlled power electronic device Q8 is connected with the positive electrode of the battery module E, and the positive electrode of precharged freewheel diode D is connected with the negative electrode of battery module E to form the low-voltage end L4 of preprocessing unit 14.

Figure 12:
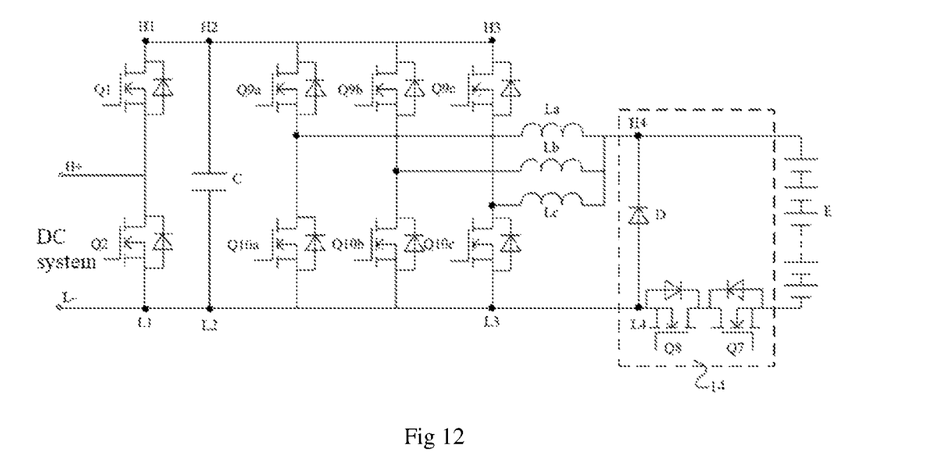
FIG. 12 is the topology structure of the battery module based on full current control provided by embodiment 9 of the invention.

The third way is as follows: As shown in FIG. 12, the negative electrode of precharged freewheel diode D is connected with the positive electrode of battery module E to form the high-voltage end H4 of preprocessing unit 14, the positive electrode of precharged freewheel diode D is connected with the low-voltage end of fully controlled power electronic device Q8 to form the low-voltage end L4 of preprocessing unit 14, the high-voltage end of the fully controlled power electronic device Q8 is connected to the high-voltage end of the fully controlled power electronic device Q7, and the low-voltage end of the fully controlled power electronic device Q7 is connected to the negative electrode of the battery module E.

Figure 13:
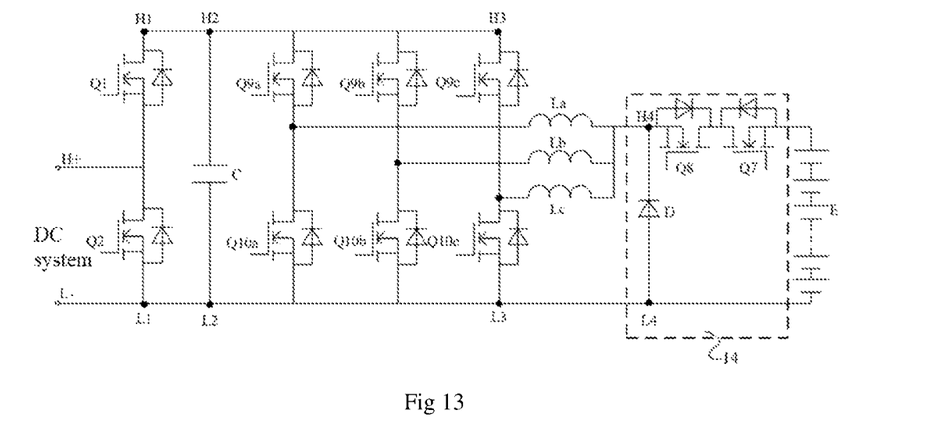
FIG. 13 is the topology structure of the battery module based on full current control provided by embodiment 10 of the invention.

The fourth way is as follows: As shown in FIG. 13, the negative electrode of the precharged freewheel diode D is connected with the low-voltage end of the fully controlled power electronic device Q8 to form the high-voltage end H4 of the preprocessing unit 14, the high-voltage end of the fully controlled power electronic device Q8 is connected with the high-voltage end of the fully controlled power electronic device Q7, the low-voltage end of the fully controlled power electronic device Q7 is connected with the positive electrode of the battery module E, and the positive electrode of precharged freewheel diode D is connected with the negative electrode of battery module E to form the low-voltage end L4 of preprocessing unit 14.

Figure 10:
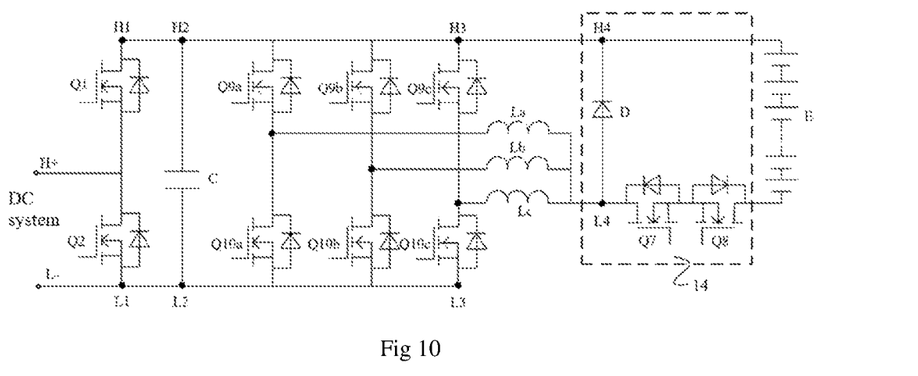
FIG. 10 is the topology structure of the battery module based on full current control provided by embodiment 7 of the invention.

It should be noted that whether the preprocessing unit 14 adopts the combination of fully controlled power electronic device Q7 and precharged freewheel diode D, or the combination of fully controlled power electronic device Q7, precharged freewheel diode D and fully controlled power electronic device Q8, there are two ways to connect it to the front-end current control unit. The first way is as follows: As shown in FIG. 10, the high-voltage end H4 of the preprocessing unit 14 is connected to the high-voltage end H3 of the current control unit 13, and the low-voltage end L4 of the preprocessing unit 14 is connected to the midpoint of the current control unit 13. The second way is as follows: As shown in FIG. 13, the high-voltage end H4 of the preprocessing unit 14 is connected to the midpoint of the above current control unit 13, and the low-voltage end L4 of the preprocessing unit 14 is connected to the low-voltage end L3 of the current control unit 13.

To sum up, the topology block diagram of the battery module based on full current control provided by the invention can be combined in various forms according to the different circuits adopted by the energy transmission control unit 11, the intermediate energy unit 12, the current control unit 13 or the pretreatment unit 14. At the same time, various deformation combination forms can be designed according to the connection mode between the energy transmission control unit 11 and the external DC system, the connection mode between the current control unit 13 and the battery module E, and the connection mode between the pretreatment unit 14 and the current control unit 13. There is no restriction in this embodiment.

The following illustrates the topology block diagram and working principle of the battery module based on full current control provided by the invention with specific embodiments.

FIG. 4 is a schematic diagram of the topology structure of the battery module based on full current control provided in Embodiment 1 of the invention. The battery module based on full current control comprises an energy transmission control unit 11, a intermediate energy unit 12 and a current control unit 13, wherein the high-voltage end H1 of the energy transmission control unit 11 is connected to the high-voltage end H2 of the intermediate energy unit 12 and the high-voltage end H3 of the current control unit 13, and the low-voltage end L1 of the energy transmission control unit 11 is connected to the low-voltage end L2 of the intermediate energy unit 12 and the low-voltage end L3 of the current control unit 13.

As shown in FIG. 4, the energy transmission control unit 11 provided in this embodiment adopts two fully controlled power electronic devices (Q1 and Q2 in FIG. 4). Please refer to the detailed introduction of energy transmission control unit 11 above for the specific connection relationship of the devices, and the connection mode between it and the external DC system adopts the second connection way between the energy transmission control unit 11 and the external DC system. In addition, the intermediate energy unit 12 adopts a DC container C, whose high and low-voltage ends correspond to the positive and negative electrodes of DC container C. The current control unit 13 adopts a controller (not shown in the figure) and a phase circuit, namely, including an upper fully controlled power electronic device Q9a, a lower fully controlled power electronic device Q10a and a DC inductor La. For the specific connection relationship of the devices, please refer to the detailed introduction of the current control unit 13 above, and he connection mode between it and the battery module E adopted is the second connection way between the current control unit 13 and the battery module E.

The working principle of the battery module based on full current control provided in this embodiment is as follows:

In the charging state, the lower fully controlled power electronic device Q10a shall be kept in off state, the intermediate energy unit 12 will charge the battery module E through the upper fully controlled power electronic device Q9a and the intermediate energy unit 12 by opening the upper fully controlled power electronic device Q9a. When Q9a is turned off, the current on the DC inductor La will form a continuous current circuit through the battery module E and the reverse or parallel diode of the lower fully controlled power electronic device Q10a, and the continuing current will continue to charge the battery module E. In one switching cycle, the charge current to the battery module E can be adjusted by controlling the duty ratio of the fully controlled power electronic device Q9a.

During charging, the charging energy of battery module E directly comes from the intermediate energy unit 12, the external DC system can be connected to the intermediate energy unit 12 by turning on the fully controlled power electronic device Q1 of the energy transmission control unit 11 and turning off the fully controlled power electronic device Q2, and the external DC system can supplement energy to the intermediate energy unit 12. Moreover, when the fully controlled power electronic device Q1 is turned off and the fully controlled power electronic device Q2 is turned on, the external DC system will form a circuit through fully controlled power electronic device Q2 and will not charge the intermediate energy unit 12. Thus, the charging energy of external DC system 20 to intermediate energy unit 12 can be controlled by controlling the opening and closing of fully controlled power electronic device Q1 in the charging state. When the current of the external DC system 20 flows from the positive DC bus H+ to the negative DC bus L−, the full-current control battery module will work in the charging state. If the fully controlled power electronic device Q1 is turned on and the fully controlled power electronic device Q2 is turned off, the current of the external DC system 20 will charge the intermediate energy unit 12 through the fully controlled power electronic device Q1. If the fully controlled power electronic device Q1 is turned off and the fully controlled power electronic device Q2 is turned on, the electricity of external DC system 20 will flow through the fully controlled power electronic device Q2 without charging the intermediate energy unit 12. Thus, the charging energy of external DC system 20 to intermediate energy unit 12 can be controlled by changing the relative length of opening time of the fully controlled power electronic device Q1.

Similarly, the voltage of intermediate energy unit 12 is generally higher than that of battery module E in discharge state. The upper fully controlled power electronic device Q9a is kept in the off state, and the battery module E will discharge through the DC inductor La and the lower fully controlled power electronic device Q10a by opening the lower fully controlled power electronic device Q10a. Then, the current on DC inductor La will increase, and DC current is stored on the DC inductor La. At this time, the voltage of the DC inductor La is negative on the left and positive on the right. When the lower fully controlled power electronic device Q10a is turned off, the current on the DC inductor La will decrease, and the voltage on DC inductor La will become positive on the left and negative on the right. When the voltage on the DC inductor La is superimposed on the voltage on the battery module E, it will be higher than that on the intermediate energy unit 12, the DC current will discharge to the intermediate energy unit 12, and the current on the DC inductor La will flow through the battery module E, the DC inductor La, the reverse or parallel diode of the upper fully controlled power electronic device Q9a and the intermediate energy unit 12 to form a circuit, so that the battery module E will discharge to the intermediate energy unit 12. In one switching cycle, the current of DC inductor La can be adjusted by controlling the duty ratio of lower fully controlled power electronic device Q10a, so as to adjust the discharge current of battery module E.

When discharging, the discharging energy of battery module E is discharged directly to the intermediate energy unit 12. The intermediate energy unit 12 can be connected to the external DC system 20 by turning on the fully controlled power electronic device Q1 of the energy transmission control unit 11 and turning off the fully controlled power electronic device Q2, so as to transfer the energy of the intermediate energy unit 12 to the external DC system 20. When the fully controlled power electronic device Q1 is turned off and the fully controlled power electronic device Q2 is turned on, the external DC system will form a circuit through the fully controlled power electronic device Q2, and there is no discharge circuit between the intermediate energy unit 12 and the external DC system 20. When the current of external DC system 20 flows from negative DC bus L− to positive DC bus H+, and the fully controlled power electronic device Q1 is turned on and the fully controlled power electronic device Q2 is turned off, the current of the external DC system 20 flowing through the negative DC bus L− of the external DC system 20, the intermediate energy unit 12, the fully controlled power electronic device Q1, and the positive DC bus H+ of the external DC system 20 will form a circuit, and the intermediate energy unit 12 will discharge to the external DC system 20. If the fully controlled power electronic device Q2 is turned on and the fully controlled power electronic device Q1 is turned off, the current of external DC system 20 flowing through negative DC bus L− of external DC system 20, the fully controlled power electronic device Q2 and the positive DC bus H+ of external DC system 20 will form a circuit, and the intermediate energy unit 12 will not flow through the current of external DC system 20, the intermediate energy unit 12 will not discharge to the external DC system 20. Therefore, the discharge energy of the intermediate energy unit 12 to the external DC system 20 can be controlled by changing the relative opening time of fully controlled power electronic device Q1.

In order to balance the charging energy of external DC system 20 to intermediate energy unit 12 and the charge current of battery module E, the controller in the current control unit 13 is used to monitor the average energy stored by the intermediate energy unit 12 in real time during the charging state. When the average energy stored by the intermediate energy unit 12 is lower than the average energy rating of the intermediate energy unit 12, the charge current of the battery module E is reduced to reduce the electric energy absorbed by the intermediate energy unit 12 by battery module E, and restore the average energy stored by the intermediate energy unit 12 to the average energy rating stored by the intermediate energy unit 12. When the average energy stored by the intermediate energy unit 12 is higher than the average energy rating of the intermediate energy unit 12, the controller will increase the charge current of battery module E to increase the electric energy absorbed by battery module E from the intermediate energy unit 12, and restore the average energy stored in intermediate energy unit 12 to the average energy rating stored in intermediate energy unit 12.

Similarly, the controller in current control unit 13 monitors the average energy stored in intermediate energy unit 12 in real time in discharging state. When the average energy stored in intermediate energy unit 12 is lower than the average energy rating stored in the intermediate energy unit 12, the discharge current of battery module E will be increased to increase the electric energy injected by the battery module E into the intermediate energy unit 12, and restore the average energy stored in the intermediate energy unit 12 to the average energy rating stored in the intermediate energy unit 12. When the average energy stored by the intermediate energy unit 12 is higher than the average energy rating of the intermediate energy unit 12, the controller will reduce the discharge current of the battery module E to reduce the electric energy injected by the battery module E to the intermediate energy unit 12, and restore the average energy stored in intermediate energy unit 12 to the average energy rating stored in intermediate energy unit 12.

FIG. 5 is the topology structure of the battery module based on full current control provided by embodiment 2 of the invention. As shown in FIG. 5, the difference between this embodiment and the embodiment 1 is that the current control unit 13 provided by this embodiment is composed of three phase circuits. That is, each phase circuit includes upper fully controlled power electronic devices (Q9a, Q9b, Q9c), lower fully controlled power electronic devices (Q10a, Q10b, Q10a) and DC inductors (La, Lb, Lc), and its working principle is the same as that of the embodiment above, which will not be repeated in this embodiment.

Compared with embodiment 1, embodiment 2 of the invention increases the number of phase circuits in the current control unit 13, and has the following advantages: 1) the parallel connection of fully controlled power electronic devices can be avoided, so that the control of each phase circuit is independent to each other; 2) The total harmonic current of battery module E can be reduced by controlling the angle of carrier difference of each phase circuit to 360°/N, wherein N indicates the number of phase circuits (N≥2); 3) The current in each phase circuit can be reduced, so as to reduce the difficulty of designing the drive and DC inductor of fully controlled power electronic devices in each phase circuit.

FIG. 6 is the topology structure of the battery module based on full current control provided by embodiment 3 of the invention. As shown in FIG. 6, the difference between this embodiment and embodiment 2 is that the connection between the current control unit 13 and the battery module E in this embodiment is the first connection way between the current control unit 13 and the battery module E, and its working principle is the same as embodiment 2, which will not be repeated in this embodiment.

FIG. 7 is the topology structure of the battery module based on full current control provided by embodiment 4 of the invention. As shown in FIG. 7, this embodiment is a further improvement on embodiment 2, and the difference from embodiment 2 is that preprocessing unit 14 composed of a fully controlled power electronic device Q7 and a precharged freewheel diode D is added. The specific connection mode of the device adopts the first connection way of the fully controlled power electronic device Q7 and the precharged freewheel diode D, and the connection mode of the device with the front-end current control unit 13 adopts the second connection way of the preprocessing unit 14 and the current control unit 13.

In order to enable the battery module based on full current control to switch from the non-working state to the working state smoothly in this embodiment, the DC container C in the intermediate energy unit 12 can be precharged through the battery module E, wherein the control logic of precharging is to control the on-off/off-off state of the fully controlled power electronic device Q7, so as to control the battery module E to charge or stop charging DC container C.

Before precharging, the voltage of DC container C is zero, which is lower than that of battery module E. When the fully controlled power electronic device Q7 is turned on, the battery module E will form a current circuit through the DC inductors (La, Lb, Lc) in the three phase circuits, the reverse or parallel diode of the upper fully controlled power electronic devices (Q9a, Q9b, Q9c), the DC electric container C, and the fully controlled power electronic device Q7, and battery module E will charge the DC electric container C. When the fully controlled power electronic device Q7 is turned off, the DC inductor La will form a circuit continuation through the reverse or parallel diode of the upper fully controlled power electronic device Q9a, the DC container C and the precharged freewheel diode D, the DC inductor Lb will form a circuit continuation through the reverse or parallel diode of the upper fully controlled power electronic device Q9b, the DC container C and the precharged freewheel diode D, and the DC inductor Lc will form a circuit continuation through the reverse or parallel diode of the upper fully controlled power electronic device Q9c, the DC container C and the precharged freewheel diode D, and these continuation current will continue to precharge the DC current container C. When the precharge is completed, the voltage of DC container C is the same as that of battery module E.

Therefore, the charge current of battery module E to DC container C can be adjusted by controlling the opening and closing of fully controlled power electronic device Q7.

FIG. 8 is the topology structure of the battery module based on full current control provided by embodiment 5 of the invention. As shown in FIG. 8, this embodiment is a further improvement of embodiment 4, and the difference from the embodiment above is that the preprocessing unit 14 provided by this embodiment also includes a fully controlled power electronic device Q8, and the connection mode of the fully controlled power electronic device Q8 in the preprocessing unit 14 provided in this embodiment to the fully controlled power electronic device Q7 and the precharged freewheel diode D is the first connection way above.

In this embodiment, the channel of battery module E can be connected by opening fully controlled power electronic device Q7 and fully controlled power electronic device Q8, and the channel of battery module E can be disconnected by shutting off fully controlled power electronic device Q7 and fully controlled power electronic device Q8, so that there is still no discharge circuit of battery module E even when the external circuit is reversed. In this way, the battery module based on full current control can prevent the reverse connection of battery module E, improve the safety of the battery module based on full current control in the assembly process and operation and maintenance process, and prevent the occurrence of overcurrent, fire and even battery explosion after the reverse connection of battery module E.

FIG. 9 is the topology structure of the battery module based on full current control provided by embodiment 6 of the invention. As shown in FIG. 9, this embodiment is a further improvement of embodiment 5, and the difference from the embodiment above is that the energy transmission control unit 11 provided by this embodiment adopts 4 fully controlled power electronic devices Q3 to Q6, and the e specific connection relationship of its devices can be referred to the detailed introduction of energy transmission control unit 11 above, which will not be repeated in this embodiment.

In this embodiment, the fully controlled power electronic device Q3 and the fully controlled power electronic device Q6 are turned on to make the battery module based on full current control output positive level, and the fully controlled power electronic device Q5 and fully controlled power electronic device Q4 are switched on to make the battery module based on full current control output negative level.

FIG. 10 is the topology structure of the battery module based on full current control provided by embodiment 7 of the invention. As shown in FIG. 10, this embodiment is another realization method of embodiment 5, and the difference from the embodiment above is that the connection mode of the current control unit 13 and the preprocessing unit 14 provided in this embodiment is the first connection way between the current control unit 13 and the preprocessing unit 14, and its working principle is the same as embodiment 5, which will not be described in this embodiment.

FIG. 11 is the topology structure of the battery module based on full current control provided by embodiment 8 of the invention. As shown in FIG. 11, this embodiment is another realization method of embodiment 5, and the difference from the embodiment above is that the connection mode of the fully controlled power electronic device Q7, the precharged freewheel diode D and the fully controlled power electronic device Q8 in the preprocessing unit 14 provided in this embodiment is the second connection way above, and its working principle is the same as embodiment 5, which will not be described in this embodiment.

FIG. 12 is the topology structure of the battery module based on full current control provided by embodiment 9 of the invention. As shown in FIG. 12, this embodiment is another realization method of embodiment 5, and the difference from the embodiment above is that the connection mode of the fully controlled power electronic device Q7, the precharged freewheel diode D and the fully controlled power electronic device Q8 in the preprocessing unit 14 provided in this embodiment is the third connection way above, and its working principle is the same as embodiment 5, which will not be described in this embodiment.

FIG. 13 is the topology structure of the battery module based on full current control provided by embodiment 10 of the invention. As shown in FIG. 13, this embodiment is another realization method of embodiment 5, and the difference from the embodiment above is that the connection mode of the fully controlled power electronic device Q7, the precharged freewheel diode D and the fully controlled power electronic device Q8 in the preprocessing unit 14 provided in this embodiment is the fourth connection way above, and its working principle is the same as embodiment 5, which will not be described in this embodiment.

FIG. 14 is the topology structure of the battery module based on full current control provided by embodiment 110 of the invention. As shown in FIG. 14, this embodiment is another realization method of embodiment 4, and the difference from the embodiment above is that the connection mode of the fully controlled power electronic device Q7 and the precharged freewheel diode D in the preprocessing unit 14 provided in this embodiment is the second connection way between the fully controlled power electronic device Q7 and the precharged freewheel diode D in the preprocessing unit 14 above, and its working principle is the same as embodiment 4, which will not be described in this embodiment.

FIG. 15 is the topology structure of the battery module based on full current control provided by embodiment 12 of the invention. As shown in FIG. 15, this embodiment is another realization method of embodiment 11, and the difference from the embodiment above is that the connection mode between the energy transmission control unit 11 and the external DC system provided in this embodiment is the first connection way between the energy transmission control unit 11 and the external DC system in the above embodiment of the energy transmission control unit 11, and its working principle is the same as embodiment 11, which will not be described in this embodiment.

Based on the same invention idea, the invention also provides a battery energy storage system based on full current control, including a plurality of the battery module based on full current controls, and the full-current control battery modules are connected to the external AC system after being connected in series or parallel.

Preferably, the number of batteries connected in series by each battery module is 12 to 24, so that the number of batteries connected in series by each battery module can be reduced to reduce the difficulty of balancing the charging status of each battery module. The balance of the state of charge of each battery module in the battery energy storage system is realized by each battery module based on full current control, and the balance of the state of charge of each battery in each battery module is realized by the battery module itself, so that the hierarchical balance of the state of charge of each battery in the whole battery energy storage system can be realized and the fire accident caused by the excessively high state of charge of each battery can be avoided.

Compared with the traditional battery energy storage system, the battery energy storage system based on full current control provided in this embodiment includes multiple battery module based on full current controls. The full current battery control module uses the energy transmission control unit to control the charging energy of the external DC system to the intermediate energy unit, prevent the energy fluctuations caused by the AC current component and harmonic current component of the external DC system from being transmitted to the back-end battery module completely, reduce the influence of the external circuit current on the working performance of the battery module, and extend the service life of the battery module effectively. At the same time, when the voltage of the battery module exceeds the cut-off voltage of charging or is lower than the cut-off voltage of discharging, the charge and discharge circuit can be cut off in time by using the energy transmission control unit, which can realize the separate control of each battery module in the battery energy storage system and avoid the risk of fire or damage caused by the over-charging heat loss of the battery module.

It is easy for a person skilled in the field to understand that the above is only a better embodiment of the invention and is not intended to limit the invention, and that any modification, equivalent substitution, improvement and the like made within the spirit and principles of the invention shall be included in the scope of protection of the invention.

What is claimed is:

1. A battery module based on full current control, applied to each battery module in a battery energy storage system, including an energy transmission control unit, an intermediate energy unit and a current control unit, wherein a high-voltage end of the energy transmission control unit is connected with high-voltage ends of the intermediate energy unit and the current control unit, respectively, a low-voltage end of the energy transmission control unit is connected with low-voltage ends of the intermediate energy unit and the current control unit, respectively, when the battery energy storage system is in a charging state, the energy transmission control unit is used to control a transmission of an electric energy output by an external DC system to the intermediate energy unit, the intermediate energy unit is used to absorb and store the electric energy output by the external DC system, the current control unit is used for a closed-loop control of a charge current of the battery module according to an average energy stored by the intermediate energy unit;

when the average energy stored by the intermediate energy unit is higher than an average energy rating, the current control unit increases the charge current of the battery module, so as to increase an electric energy absorbed by the battery module from the intermediate energy unit; when the average energy stored by the intermediate energy unit is lower than the average energy rating stored by the intermediate energy unit, the current control unit reduces the charge current of the battery module to reduce the electric energy absorbed by the battery module from the intermediate energy unit, balances the electric energy output by the external DC system after deducting a loss of the battery energy storage system with a charging energy required by the battery module, and control the intermediate energy unit to stop absorbing energy from the external DC system through the energy transmission control unit when a voltage of the battery module exceeds a cut-off voltage of charging;

when the battery energy storage system is in a discharging state, the intermediate energy unit is used to absorb and store the discharge energy output by the battery module, the energy transmission control unit is used to control a transmission of energy stored by the intermediate energy unit to the external DC system, the current control unit is used for the closed-loop control of the discharge current of the battery module according to the average energy stored by the intermediate energy unit;

when the average energy stored by the intermediate energy unit is higher than the average energy rating stored by the intermediate energy unit, the current control unit reduces the discharge current to the battery module, so as to reduce an electric energy injected by the battery module into the intermediate energy unit; and when the average energy stored by the intermediate energy unit is lower than the average energy rating stored by the intermediate energy unit, the current control unit increases the discharge current of the battery module to increase the electric energy injected by the battery module into the intermediate energy unit, balances electric energy obtained by the external DC system with the discharge energy of the battery module after deducting the loss of the battery energy storage system, and controls the intermediate energy unit to stop transmitting energy to the external DC system or external discharge load through the energy transmission control unit when the voltage of the battery module is lower than the cut-off voltage of charging.

2. The battery module based on full current control according to claim 1, wherein the energy transmission control unit includes fully controlled power electronic devices Q1 and Q2, a low-voltage end of the hilly controlled power electronic device Q1 and a high-voltage end of the fully controlled power electronic device Q2 are connected together to form a midpoint of the energy transmission control unit, a high-voltage end of the fully controlled power electronic device Q1 is the high-voltage end of the energy transmission control unit, a low-voltage end of the fully controlled power electronic device Q2 is the low-voltage end of the energy transmission control unit, the energy transmission control unit and the external DC system are connected in two ways; and wherein a first way is as follows: the high-voltage end of the energy transmission control unit is connected with a positive DC bus of the external DC system, the midpoint of the energy transmission control unit is connected with a negative DC bus of the external DC system; and a second way is as follows: the midpoint of the energy transmission control unit is connected with the positive DC bus of the external DC system, and the low-voltage end of the energy transmission control unit is connected with the negative DC bus of the external DC system.

3. The battery module based on full current control according to claim 1, wherein the energy transmission control unit includes fully controlled power electronic devices Q3~Q6, a high-voltage end of the fully controlled power electronic device Q3 and a high-voltage end of the fully controlled power electronic device Q4 are connected together to form the high-voltage end of the energy transmission control unit, a low-voltage end of the fully controlled power electronic device Q5 and a low-voltage end of the fully controlled power electronic device Q6 are connected together to form the low-voltage end of the energy transmission control unit, a low-voltage end of the fully controlled power electronic device Q3 is respectively connected with a high-voltage end of the fully controlled power electronic device Q5 and the positive DC bus of the external DC system, and a low-voltage end of the fully controlled power electronic device Q4 is respectively connected with a high-voltage end of the fully controlled power electronic device Q6 and the negative DC bus of the external DC system.

4. The battery module based on full current control according to claim 1, wherein the intermediate energy unit includes one or more parallel DC capacitors C, a positive electrode of the DC capacitor C is the high-voltage end of the intermediate energy unit, and a negative electrode of the DC capacitor C is the low-voltage end of the intermediate energy unit.

5. The battery module based on full current control according to claim 1, wherein the current control unit includes one or more phase circuits, and a controller; each phase circuit includes an upper fully controlled power electronic device, a lower fully controlled power electronic device and a DC inductor, the controller is respectively connected with the energy transmission control unit, the intermediate energy unit, the upper fully controlled power electronic device and the lower fully controlled power electronic device in each phase circuit, a high-voltage end of the upper fully controlled power electronic device in each phase circuit is connected together to form a high-voltage end of the current control unit, in the same phase circuit, a low-voltage end of the upper fully controlled power electronic device is connected with a high-voltage end of the lower fully controlled power electronic device and one end of the DC inductor, the other end of the DC inductor in each phase circuit is connected together to form a midpoint of the current control unit, and a low-voltage end of the lower fully controlled power electronic device in each phase circuit is connected together to form a low-voltage end of the current control unit, the current control unit and the battery module are connected in two ways; and wherein a first way is as follows: the high-voltage end of the current control unit is connected with a positive electrode of the battery module, and the midpoint of the current control unit is connected with a negative electrode of the battery module, a second way is as follows: the midpoint of the current control unit is connected with the positive electrode of the battery module, and the low-voltage end of the current control unit is connected with the negative electrode of the battery module.

6. The battery module based on full current control according to claim 5, wherein when a number of phase circuits N in the current control unit is multiple, a carrier difference angle of each phase circuit is 360°/N in turn.

7. The battery module based on full current control according to claim 5, wherein it also includes a preprocessing unit, the preprocessing unit includes a fully controlled power electronic device Q7 and a precharged freewheel diode D, and the fully controlled power electronic device Q7 and the precharged freewheel diode D are connected in two ways, a first way is as follows: a positive electrode of the precharged freewheel diode D is connected with a high-voltage end of the fully controlled power electronic device Q7 to form a low-voltage end of the preprocessing unit, a negative electrode of the precharged freewheel diode D is connected with the positive electrode of the battery module to form a high-voltage end of the preprocessing unit, and a low-voltage end of the fully controlled power electronic device Q7 is connected with the negative electrode of the battery module, a second way is as follows: the negative electrode of the precharged freewheel diode D is connected with the low-voltage end of the fully controlled power electronic device Q7 to form the high-voltage end of the preprocessing unit, the high-voltage end of the fully controlled power electronic device Q7 is connected with the positive electrode of the battery module, and the positive electrode of the precharged freewheel diode D is connected with the negative electrode of the battery module to form the low-voltage end of the preprocessing unit.

8. The battery module based on full current control according to claim 7, wherein the preprocessing unit and the current control unit are connected in two ways, a first way is as follows: the high-voltage end of the preprocessing unit is connected with the high-voltage end of the current control unit, and the low-voltage end of the preprocessing unit is connected with the midpoint of the current control unit, a second way is as follows: the high-voltage end of the preprocessing unit is connected with the midpoint of the current control unit, and the low-voltage end of the preprocessing unit is connected with the low-voltage end of the current control unit.

9. The battery module based on full current control according to claim 5, wherein it also includes a pre-processing unit, including a fully controlled power electronic device Q7, a freewheel diode D, and a fully controlled power electronic device Q8, the fully controlled power electronic device Q8, the fully controlled power electronic device Q7 and the precharged current freewheel diode D are connected in four ways, a first way is as follows: a negative electrode of the precharged freewheel diode D is connected with the positive electrode of the battery module to form a high-voltage end of the preprocessing unit, a positive electrode of the precharged freewheel diode D is connected with a high-voltage end of the fully controlled power electronic device Q7 to form a low-voltage end of the preprocessing unit, a low-voltage end of the fully controlled power electronic device Q7 is connected with a low-voltage end of the fully controlled power electronic device Q8, and a high-voltage end of the fully controlled power electronic device Q8 is connected with the negative electrode of the battery module, a second way is as follows: the negative electrode of the precharged freewheel diode D is connected with the high-voltage end of the fully controlled power electronic device Q7 to form the high-voltage end of the preprocessing unit, the low-voltage end of the fully controlled power electronic device Q7 is connected with the low-voltage end of the fully controlled power electronic device Q8, the high-voltage end of the fully controlled power electronic device Q8 is connected with the positive electrode of the battery module, and the positive electrode of the precharged freewheel diode D and the negative electrode of the battery module are connected together to form the low-voltage end of the preprocessing unit, a third way is as follows: the negative electrode of the precharged freewheel diode D is connected with the positive electrode of the battery module to form the high-voltage end of the preprocessing unit, the positive electrode of the precharged freewheel diode D is connected with the low-voltage end of the fully controlled power electronic device Q8 to form the low-voltage end of the preprocessing unit, the high-voltage end of the fully controlled power electronic device Q8 is connected with the high-voltage end of the fully controlled power electronic device Q7, and the low-voltage end of the fully controlled power electronic device Q7 is connected with the negative electrode of the battery module, a fourth way is as follows: the negative electrode of the precharged freewheel diode D is connected with the low-voltage end of the fully controlled power electronic device Q8 to form the high-voltage end of the preprocessing unit, the high-voltage end of the fully controlled power electronic device Q8 is connected with the high-voltage end of the fully controlled power electronic device Q7, the low-voltage end of the fully controlled power electronic device Q7 is connected with the positive electrode of the battery module, and the positive electrode of the precharged current freewheel diode D is connected with the negative electrode of the battery module to form the low-voltage end of the preprocessing unit.

10. The battery module based on full current control according to claim 5, wherein the upper fully controlled power electronic device and the lower fully controlled power electronic device are provided with one or more transistors and diodes in reverse parallel with them.

11. The battery module based on full current control according to claim 10, wherein the transistor is a transistor with power field effect or an insulated-gate bipolar transistor.

12. A battery energy storage system based on full current control, including a plurality of battery modules based on full current control described in claim 1, wherein the full current control battery modules are connected with an external AC system after being connected in series or in parallel.

13. The battery energy storage system based on full current control according to claim 12, wherein a number of individual batteries connected in series to each full current control battery module is 12-24.

* * * * *